United States Patent
Tonami et al.

(10) Patent No.: US 7,417,760 B2
(45) Date of Patent: Aug. 26, 2008

(54) FACSIMILE SYSTEM

(75) Inventors: Kazumasa Tonami, Yamatokoriyama (JP); Satoshi Murakami, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 707 days.

(21) Appl. No.: 11/123,803

(22) Filed: May 6, 2005

(65) Prior Publication Data

US 2006/0066895 A1    Mar. 30, 2006

(30) Foreign Application Priority Data

Sep. 29, 2004    (JP) ............................. P2004-284983

(51) Int. Cl.
*G06K 15/00* (2006.01)
*H04N 1/00* (2006.01)

(52) U.S. Cl. ...................... 358/1.15; 358/400; 358/407

(58) Field of Classification Search ................. 358/400, 358/407, 1.15, 402, 405, 434, 440; 379/100.01, 379/100.05, 100.06, 100.08, 100.09
See application file for complete search history.

(56) References Cited

U.S. PATENT DOCUMENTS

| | | | |
|---|---|---|---|
| 6,249,356 | B1 | 6/2001 | Yoshikawa et al. |
| 6,735,615 | B1* | 5/2004 | Iwayama et al. ............ 709/204 |
| 2001/0005859 | A1* | 6/2001 | Okuyama et al. ........... 709/245 |
| 2002/0178074 | A1* | 11/2002 | Bloom ......................... 705/26 |
| 2003/0093675 | A1* | 5/2003 | Hibino et al. ............... 713/168 |
| 2004/0030916 | A1* | 2/2004 | Karamchedu et al. ....... 713/200 |
| 2004/0131081 | A1* | 7/2004 | Bhatia et al. ................ 370/466 |
| 2005/0036167 | A1* | 2/2005 | Atsumi ...................... 358/1.15 |

| | | | |
|---|---|---|---|
| 2005/0048998 | A1* | 3/2005 | Zhu ......................... 455/550.1 |

FOREIGN PATENT DOCUMENTS

| | | |
|---|---|---|
| JP | 01-302951 | 12/1989 |
| JP | 03-255775 | 11/1991 |
| JP | 4-124971 | 4/1992 |
| JP | 06-326847 | 11/1994 |
| JP | 07-212395 | 8/1995 |
| JP | 09-008982 | 1/1997 |
| JP | 09055803 | * 2/1997 |
| JP | 09-130488 | 5/1997 |
| JP | 09-331414 | 12/1997 |
| JP | 10-107944 | 4/1998 |
| JP | 10-336411 | 12/1998 |
| JP | 11-205489 | 7/1999 |

(Continued)

*Primary Examiner*—Jerome Grant, II
(74) *Attorney, Agent, or Firm*—David G. Conlin; David A. Tucker; Edwards Angell Palmer & Dodge LLP

(57) ABSTRACT

A main controlling portion controls each portion of a facsimile system, and when a communication controlling portion receives facsimile communication information from a sender indicated by predetermined sender information stored in a storing portion, causes a LAN controlling portion to notify a notify party indicated by notify party information associated with the received sender information of notification information only when determining that a predetermined notification condition is satisfied. It is possible to notify of the notification information only when the predetermined notification condition desired by a user is satisfied, and it is possible to increase convenience. Moreover, consequently, the facsimile system does not execute an operation process of notifying of the notification information when the predetermined condition is not satisfied, so that it is possible to prevent a wasteful operation process.

14 Claims, 11 Drawing Sheets

FOREIGN PATENT DOCUMENTS

| | | |
|---|---|---|
| JP | 2000-261596 | 9/2000 |
| JP | 2000-295403 | 10/2000 |
| JP | 2001-297042 | 10/2001 |
| JP | 2001-309084 | 11/2001 |
| JP | 2002-247317 | 8/2002 |

* cited by examiner

FIG. 4

| REGISTERED PARTY === **--**** | | |
|---|---|---|
| NOTIFY PARTY | EFFECTIVE TERM | REMAINING NUMBER OF NOTIFICATIONS |
| 1. ✉ ab***@****.co.jp | 04°7/7 AM10:00 | ----- |
| 2. ✉ cd***@****.co.jp | 04°7/8 PM5:00 | ----- |
| 3. ✉ ef***@****.co.jp | ----- | 10 |
| 4. ✉ gh***@****.co.jp | EVERY FOURTH MONDAY | ----- |

FIG. 6

```
                        FAX RECEPTION
************ NOTIFICATION **************

FAX FROM REGISTERED ○○ CO., LTD HAS BEEN RECEIVED.

[NOTIFICATION CONTENTS]
   TIME:          04' 12/12 12:00
   SHEET SIZE:    A4
   NUMBER OF
       SHEETS :   FIVE
   IMPORTANCE:    ORDINARY

[EFFECTIVE REGISTRATION CONTENTS]
       REMAINING
    NOTIFICATION TIME: TWO HOURS AND TWELVE MINUTES
     REMAINING NUMBER
     OF NOTIFICATIONS: —

[NOTIFY PARTY]
   SATO ○○ , KIMURA ○○

[FAX TEXT INFORMATION]
   FAX NUMBER: ****. **. ****
   IP        : ***. ***. ***. **

END

*****************************************
```

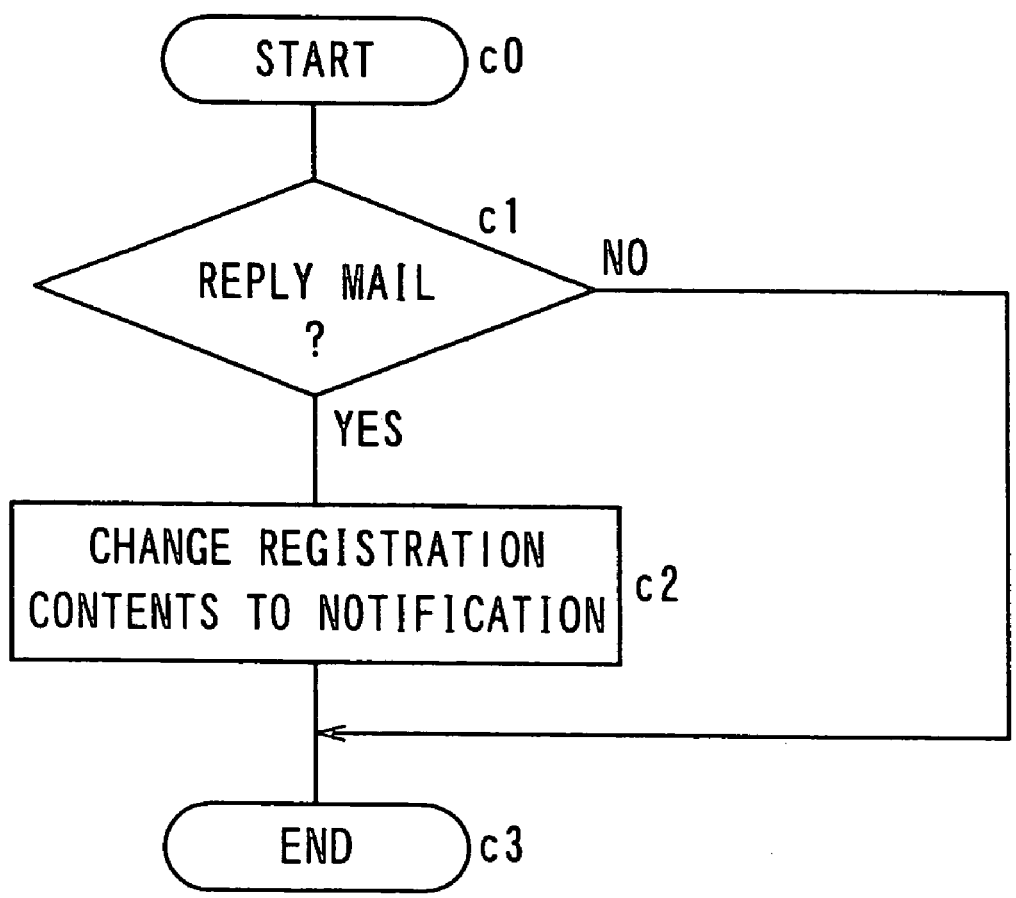

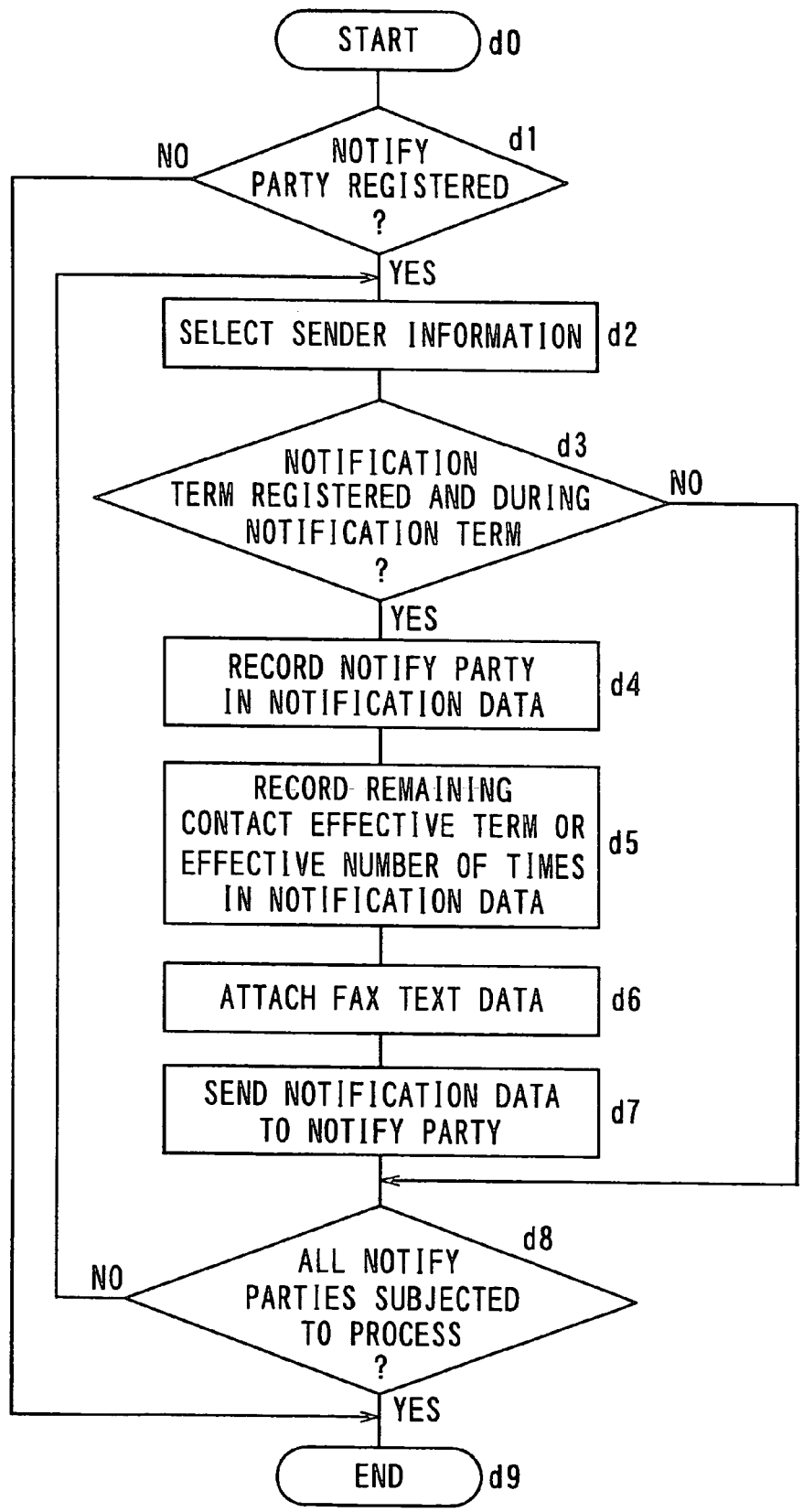

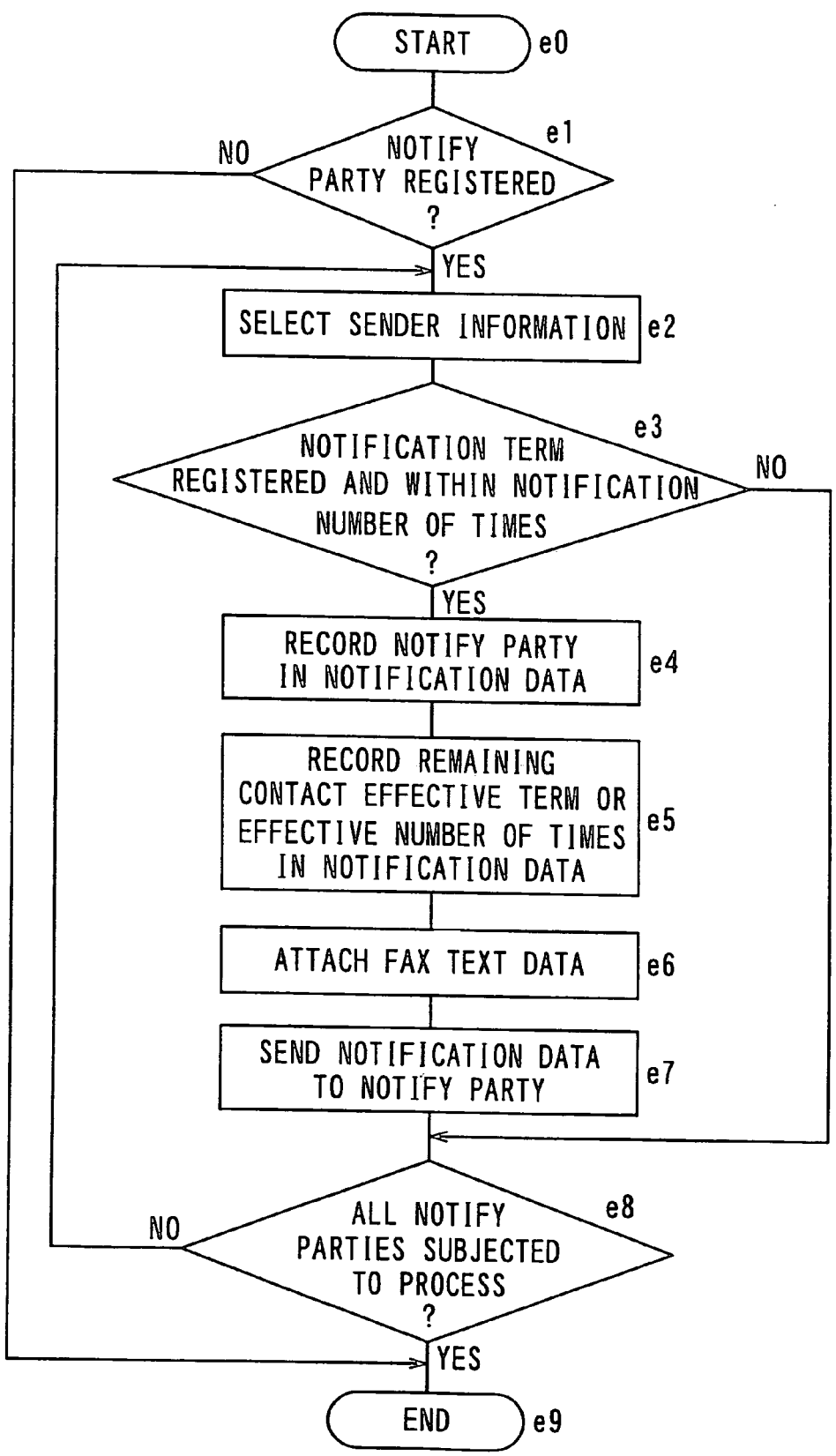

FACSIMILE SYSTEM

BACKGROUND OF THE INVENTION

1. Field of the Invention

The present invention relates to a facsimile system that, when receiving facsimile communication information, notifies a predetermined notify party of the reception.

2. Description of the Related Art

As a prior art, there is a facsimile apparatus that receives image data and address information of a destination thereof by facsimile communication via the public switched telephone network, writes an arrival notification mail for notifying that the image data has arrived on the basis of the address information of the destination, and sends the written arrival notification mail to a server on a network (refer to Japanese Unexamined Patent Publication JP-A 10-107944 (1998), for example).

When the facsimile apparatus of the prior art receives image data by facsimile communication, it always notifies that the image data has been received. Therefore, even when a user does not want to notify that image data has been received by facsimile communication, the apparatus notifies, so that there is a problem such that it is inconvenient. Moreover, the facsimile apparatus executes a process for notification even when the user does not want to notify, so that there is a problem such that waste of processes increases.

SUMMARY OF THE INVENTION

An object of the invention is to provide a facsimile system that is capable of notifying a user of notification information indicative of reception of facsimile communication information only when the user desires to be notified, and is capable of preventing an unnecessary process from being carried out.

The invention provides a facsimile system comprising:

receiving means for receiving facsimile communication information given via a communication line and sender information indicative of a sender who sent the facsimile communication information;

notifying means for notifying of notification information indicative that the facsimile communication information was received;

storing means for storing predetermined sender information and notify party information indicative of a notify party in association with each other; and controlling means for causing, when the receiving means receives the facsimile communication information and the sender information, the notifying means to notify the notify party, indicated by the notify party information associated with the received sender information, of the notify party information only when determining that the received sender information is stored in the storing means and, in a case where a predetermined notification condition is set, the predetermined notification condition is satisfied.

Further, in the invention, it is preferable that the storing means stores term information indicative of a predetermined term in association with the predetermined sender information and the notify party information, and the controlling means determines that the predetermined notification condition is satisfied when the facsimile communication information from a sender indicated by the predetermined sender information has been received during the predetermined term indicated by the term information.

Furthermore, in the invention, it is preferable that the facsimile system further comprises counting means for counting the number of receptions of the facsimile communication information given from the sender indicated by the predetermined sender information stored in the storing means and received by the receiving means, and that the storing means stores number-of-receptions information indicative of a predetermined number of receptions in association with the predetermined sender information and the notify party information, and the controlling means determines that the predetermined notification condition is satisfied when the number of receptions counted by the counting means is equal to or less than the predetermined number of receptions indicated by the number-of-receptions information stored in the storing means.

Still further, in the invention, it is preferable that the notification information includes the notify party information stored in association with the predetermined sender information in the storing means.

Still further, in the invention, it is preferable that the facsimile system further comprises inputting means for inputting contact information in association with the predetermined sender information; and management information storing means for storing contact information that can be stored in the storing means, and that only when the contact information inputted by the inputting means is stored in the management information storing means, the controlling means causes the storing means to store the inputted contact information.

Still further, in the invention, it is preferable that the notification information includes the facsimile communication information received by the receiving means.

Still further, in the invention, it is preferable that the notification information includes relevant-to-term information that is relevant to the term information stored in the storing means, and the relevant-to-term information represents, of the predetermined term indicated by the term information, a remaining term from reception of the facsimile communication information by the controlling means till the end of the predetermined term indicated by the term information.

Still further, in the invention, it is preferable that the notification information includes relevant-to-number-of-receptions information that is relevant to the number of receptions stored in the storing means, and the relevant-to-number-of-receptions information represents a remaining number of receptions obtained by subtracting the number of times that is the number of receptions of the facsimile communication information from the sender indicated by the predetermined sender information counted by the counting means, from the predetermined number of receptions stored in the storing means.

Still further, in the invention, it is preferable that the facsimile system further comprises detecting means for detecting whether or not the facsimile communication information received by the receiving means includes important information indicative that the facsimile communication information is important, and that the controlling means determines that the predetermined notification condition is satisfied when the facsimile communication information received by the receiving means includes the important information.

Still further, in the invention, it is preferable that the facsimile system further comprises change setting information storing means for storing change setting information used for changing the predetermined condition, and that the receiving means receives an e-mail given via the communication line, the notifying means notifies of the notification information by e-mail, and the controlling means changes the predetermined condition on the basis of the change setting information stored in the change setting information storing means when a reply mail to the e-mail sent by the notifying means is sent, and received by the receiving means.

According to the invention, when the receiving means receives the facsimile communication information from the sender indicated by the predetermined sender information stored in the storing means, it is possible to cause the notifying means to notify the notify party, indicated by the notify party information associated with the received sender information, of the notification information only when it is determined that, in a cese where a predetermined notification condition is set, the predetermined notification condition is satisfied. In other words, even when the receiving means receives the facsimile communication information from the sender indicated by the predetermined sender information stored in the storing means, the notifying means is not caused to notify of the notification information when the predetermined notification condition is not satisfied. By setting the predetermined notification condition to a condition desired by the user, it is possible to notify of the notification information only when the condition desired by the user is satisfied, and it is possible to increase convenience. Moreover, consequently, the facsimile system does not execute an operation process of notifying of the notification information when the predetermined condition is not satisfied, so that it is possible to prevent a wasteful operation process and, for example, it is possible to prevent that another operation process in the facsimile system such as an operation for facsimile communication is interrupted. Furthermore, even when the processing efficiency of the controlling means is low, it is possible to smoothly control the facsimile system.

The notifying means may be configured so as to have, for example, an e-mail function or a telephone function. With such notifying means, even when the user is in a remote place away from the facsimile system, by obtaining the notification information that the notify party has been notified of, the user can be notified that the facsimile system has received the facsimile communication information, and can grasp that the facsimile communication information has been received.

Further, according to the invention, the controlling means determines that the predetermined notification condition is satisfied when the facsimile communication information from the sender indicated by the predetermined sender information has been received during the predetermined term indicated by the term information. By setting the predetermined notification condition to a condition relevant to a term in this way, it is possible to notify of the notification information only during a term desired by the user. In a case where reception of the facsimile communication information is predetermined, notification out of the predetermined term is prevented, so that it is possible to prevent wastefully notifying the notify party of the notification information, and it is possible to reduce processes of the facsimile system.

Furthermore, according to the invention, the counting means counts the number of receptions of the facsimile communication information given from the sender indicated by the predetermined sender information stored in the storing means and received by the receiving means. When the number of receptions counted by the counting means is equal to or less than the number of receptions indicated by the predetermined number-of-receptions information stored in the storing means, the controlling means determines that the predetermined notification condition is satisfied. By setting the predetermined condition to a condition relevant to the number of receptions in this way, it is possible to notify of the notification information by the number of receptions desired by a receiver. In a case where the number of times of receiving the facsimile communication information is predetermined, notification of the notification information is prevented when the facsimile communication information has been received more than the predetermined number of receptions, so that it is possible to prevent wastefully notifying the notify party of the notification information, and it is possible to reduce the processes of the facsimile system.

Still further, according to the invention, the notification information includes the notify party information stored by the storing means in association with the predetermined sender information, so that the user can know the notify party notified of the notification information, by obtaining the notification information. For example, in a case where the received facsimile communication information is printed and a plurality of notified parties are notified of the notification information, there is a strong possibility that any notified person of the plurality of notified parties keeps the printed facsimile communication information. In this case, it is possible to narrow the notified person keeping the printed facsimile communication information, and it is possible to reduce time to look for the printed facsimile communication information.

Still further, according to the invention, even if the contacted party information is inputted by the inputting means in association with the predetermined sender information, when the contacted party information is not stored in the management information storing means, the controlling means does not cause the storing means to store the contacted party information inputted by the inputting means. Consequently, it is prevented that a contacted party that is not stored in the management information storing means is notified of the notification information, and it is possible to prevent leakage of a top secret.

Still further, according to the invention, the notification information includes the facsimile communication information received by the receiving means, so that the notify party can immediately grasp the contents of the facsimile communication information. This saves time for going to a place where the facsimile system is placed to confirm the contents of the facsimile communication information, and can further increase convenience. For example, notification of the notification information is performed by e-mail, and in this case, notification of the facsimile communication information may be performed with the facsimile communication information added to the e-mail.

Still further, according to the invention, the notification information includes the relevant-to-term information that is relevant to the term information stored in the storing means, so that the notify party can know about a term of notification of the notification information. The relevant-to-term information represents, of the predetermined term indicated by the term information, a remaining term from reception of the facsimile communication information till the end of the predetermined term indicated by the term information. Consequently, in a case where the notified person of the notify party is scheduled to receive the facsimile communication information, for example, the notified person can use as a material for determining whether to change notification term information, and use as a material for determining whether to make a contact with a sender scheduled to send the facsimile communication information to the notified person, so that it is possible to further increase convenience.

Still further, according to the invention, the notification information includes the relevant-to-number-of-receptions information that is relevant to the number of receptions stored in the storing means. The relevant-to-number-of-receptions information represents a remaining number of receptions obtained by subtracting the number of receptions that the counting means counts the facsimile communication information from the sender indicated by the predetermined sender information, from the predetermined number of receptions stored in the storing means. When the facsimile communication information from the sender indicated by the predetermined sender information is received, the notify party indicated by the notify party information stored in association with the predetermined sender information is notified of all the notification information, so that in a case where plural pieces of notify party information are stored associated with the predetermined sender information, there is a case where some notified parties are notified of the notification information that is not directly related to them. Therefore, by notification of the number-of-receptions information, the notified person of the notify party can use as a material for determining whether to change the number-of-receptions information when it is scheduled that the facsimile communication information is sent to him/her.

Still further, according to the invention, the detecting means detects whether or not the facsimile communication information received by the receiving means includes the important information indicative that the facsimile communication information is important. The controlling means determines that the predetermined notification condition is satisfied when the facsimile communication information received by the receiving means includes the important information, so that it is possible to notify the notify party in the case of facsimile information of urgency. Consequently, it is possible to further increase convenience. Detection of the important information may be performed by character recognition of that the facsimile communication information includes character information such as "important" or "urgent," or may be performed by detecting an F code indicative of the degree of importance included in the facsimile communication information.

Still further, according to the invention, the notification information is sent by e-mail. When a reply mail to the sent e-mail is sent from the notified party and received by the receiving means, the controlling means changes the predetermined condition on the basis of the change setting information stored in the change setting information storing means. The notified party can change the predetermined condition by a simple operation of sending the reply mail to the e-mail sent from the facsimile system, so that it is possible to further increase convenience.

BRIEF DESCRIPTION OF THE DRAWINGS

Other and further objects, features, and advantages of the invention will be more explicit from the following detailed description taken with reference to the drawings wherein:

FIG. 4 is a view showing a state where the displaying portion displays the registration contents registered in the storing portion on the basis of the condition table of the storing portion;

FIG. 6 is a view showing a state where the display device displays the notification information indicated by the notification data sent to the notify party at step;

FIG. 9 is a flowchart showing an operation process of the main controlling portion when an e-mail is received;

FIG. 10 is a flowchart showing an operation process of the main controlling portion in a facsimile system according to still another embodiment of the invention; and FIG. 11 is a flowchart showing an operation process of the main controlling portion in a facsimile system according to still another embodiment of the invention.

DETAILED DESCRIPTION

Figure 1:
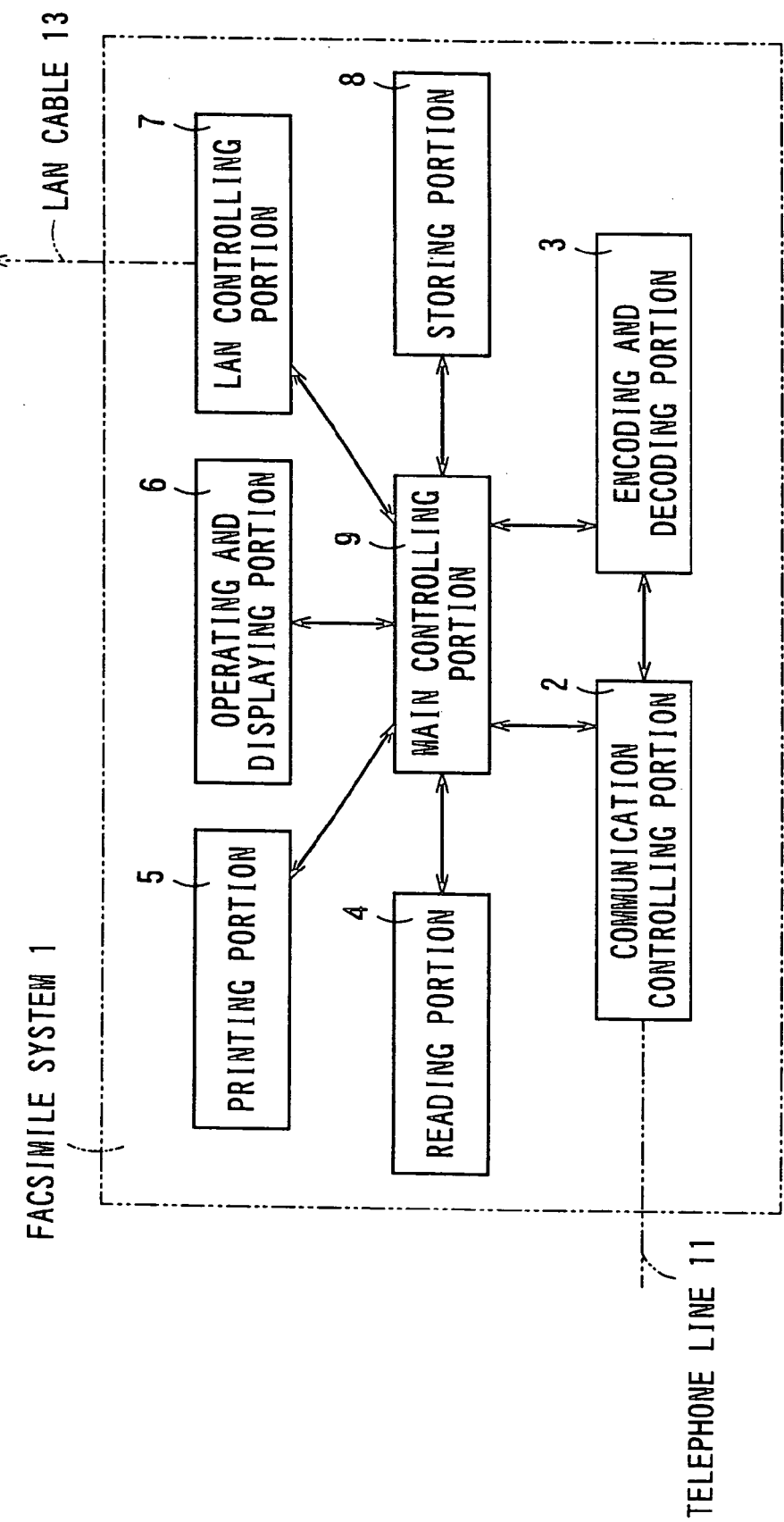
FIG. 1 is a function block diagram showing the structure of a facsimile system according to an embodiment of the invention.

Now referring to the drawings, preferred embodiments of the invention are described below.

FIG. 1 is a function block diagram showing the structure of a facsimile system 1 according to an embodiment of the invention. The facsimile system 1 comprises a communication controlling portion 2, an encoding and decoding portion 3, a reading portion 4, a printing portion 5, an operating and displaying portion 6, a LAN (local area network) controlling portion 7, a storing portion 8 and a main controlling portion 9.

The communication controlling portion 2 is receiving means and connected to a communication line, and receives facsimile communication information given via the communication line and sender information that represents a sender sending the facsimile communication information. In the present embodiment, the communication line is a telephone line 11. Moreover, via the telephone line 11, the communication controlling portion 2 sends the facsimile communication information to another facsimile apparatus connected to the telephone line 11. The communication controlling portion 2 sends image data as the facsimile communication information, and receives the facsimile communication information according to a communication protocol of facsimile communication. The facsimile communication information received via the telephone line 11 is encoded according to a predetermined encoding method. The facsimile communication information is image information, and represented by the image data. The communication controlling portion 2 operates on the basis of a control command given from the main controlling portion 9. When receiving the facsimile communication information, the communication controlling portion 2 gives the received facsimile communication information to the encoding and decoding portion 3. The sender information is caller identification information given with the facsimile communication information via the telephone line 11 by a communications business company. The communication controlling portion 2 is realized including, for example, a network control unit (abbreviated as NCU) and a modem.

The encoding and decoding portion 3 decodes the image data that represents the facsimile communication information given from the communication controlling portion 2, and decodes the image data faxed via the telephone line 11 by the communication controlling portion 2. The image data indicative of the facsimile communication information is transmitted via the telephone line 11 in a state where it is encoded according to a predetermined encoding method. As the predetermined encoding method, for example, an MH (modified Huffman) Method, an MMR (modified read) method, a JPEG (joint photographic experts group) method and the like are used. When given the encoded image data from the communication controlling portion 2, the encoding and decoding portion 3 decodes the image data. Moreover, when given the image data to be faxed by the main controlling portion 9, the encoding and decoding portion 3 encodes the image data. The encoding and decoding portion 3 operates on the basis of a control command given by the main controlling portion 9. The encoding and decoding portion 3 gives the encoded image data to the communication controlling portion 2, and gives the decoded image data to the storing portion 8 so as to be stored therein.

The reading portion 4 is realized by a scanner device including, for example, a CCD (charge coupled device) image sensor. The reading portion 4 converts image information of a document to the image data, and reads it on the basis of a control command given by the main controlling portion 9. The image information read by the reading portion 4 is stored in the storing portion 8 as the image data. In a case where the facsimile system 1 faxes, the reading portion 4 reads the image information of the document, the encoding and decoding portion 3 encodes the image data, and thereafter, the communication controlling portion 2 sends as the facsimile communication information to another facsimile apparatus via the telephone line 11.

The printing portion 5 is realized by, for example, a printer device. The printing portion 5 prints an image based on the image data onto a recording medium such as a sheet of paper on the basis of a control command given by the main controlling portion 9. The printing portion 5 is a color printer device that is capable of printing an image in color. When the facsimile system 1 receives the facsimile communication information, the encoding and decoding portion 3 decodes the image data that represents the facsimile communication information, and thereafter, the printing portion 5 prints onto the recording medium.

The operating and displaying portion 6 includes an operating portion 6a and a displaying portion 6b. The operating portion 6a is inputting means. The operating portion 6a includes a plurality of operating keys 12. When an operator operates the respective operating keys 12, information associated with each of the operating keys 12 is thereby given to the main controlling portion 9. The displaying portion 6b displays various kinds of information on the basis of a control command given by the main controlling portion 9. For example, the displaying portion 6b displays the received facsimile communication information, and displays the information inputted by operation of the respective operating keys 12.

The LAN (local area network) controlling portion 7 is connected to a LAN via a LAN cable 13. The LAN controlling portion 7 communicates with a mail server apparatus 16 connected to the LAN according to a communication protocol of the LAN. The LAN controlling portion 7 operates on the basis of a control command given by the main controlling portion 9. The LAN controlling portion 7 works as notifying means and mail receiving means.

The storing portion 8 is storing means and is realized by a nonvolatile recording medium such as a flash ROM (read only memory) and an EEPROM (electric erasable programmable ROM), and stores various kinds of information such as the image data decoded by the encoding and decoding portion 3 and the image data read by the reading portion 4 on the basis of a command from the main controlling portion 9. The information stored in the storing portion 8 can be read out by the main controlling portion 9. In the storing portion 8, a table that shows a condition for notifying reception of the facsimile communication information is stored. Hereafter, the table that shows the condition for notifying reception of the facsimile communication information will be simply stated as the condition table. The condition table will be described later.

The main controlling portion 9 is controlling means and is constituted of a central processing unit (abbreviated as CPU) and a ROM in which a control program is stored. When the central processing unit executes the control program, the main controlling portion 9 gives the control commands to the respective portions of the facsimile system 1, that is, to the communication controlling portion 2, the encoding and decoding portion 3, the reading portion 4, the printing portion 5, the operating and displaying portion 6, the LAN controlling portion 7 and the storing portion 8, and controls them. A controlling operation of the main controlling portion 9 will be described later. The main controlling portion 9 has a function of, when the communication controlling portion 2 receives the facsimile communication information, generating notification information that represents reception of the facsimile information and causing the LAN controlling portion 7 to send the generated notification information to a predetermined sending destination.

The control program contains a mail sending and receiving program for sending and receiving e-mails. When the central processing unit executes the mail sending and receiving program, the main controlling portion 9 can thereby send and receive e-mails via the LAN controlling portion 7. Moreover, the control program contains a facsimile communication program for facsimile communication. When the central processing unit executes the facsimile communication program, the main controlling portion 9 can thereby execute facsimile communication via the communication controlling portion 2. Furthermore, the control program contains a control program of telephone communications. When the central processing unit executes the control program of telephone communications, the main controlling portion 9 can thereby call a communication destination via the communication controlling portion 2. Although e-mails are sent and received via the LAN controlling portion 7 in the present embodiment, it is also possible to configure so as to send and receive e-mails via the communication controlling portion 2 in another embodiment of the invention. Moreover, the main controlling portion 9 functions as detecting means for detecting whether or not facsimile communication information received by the communication controlling portion 2 includes the important information indicative that the facsimile communication information is important.

Figure 2:
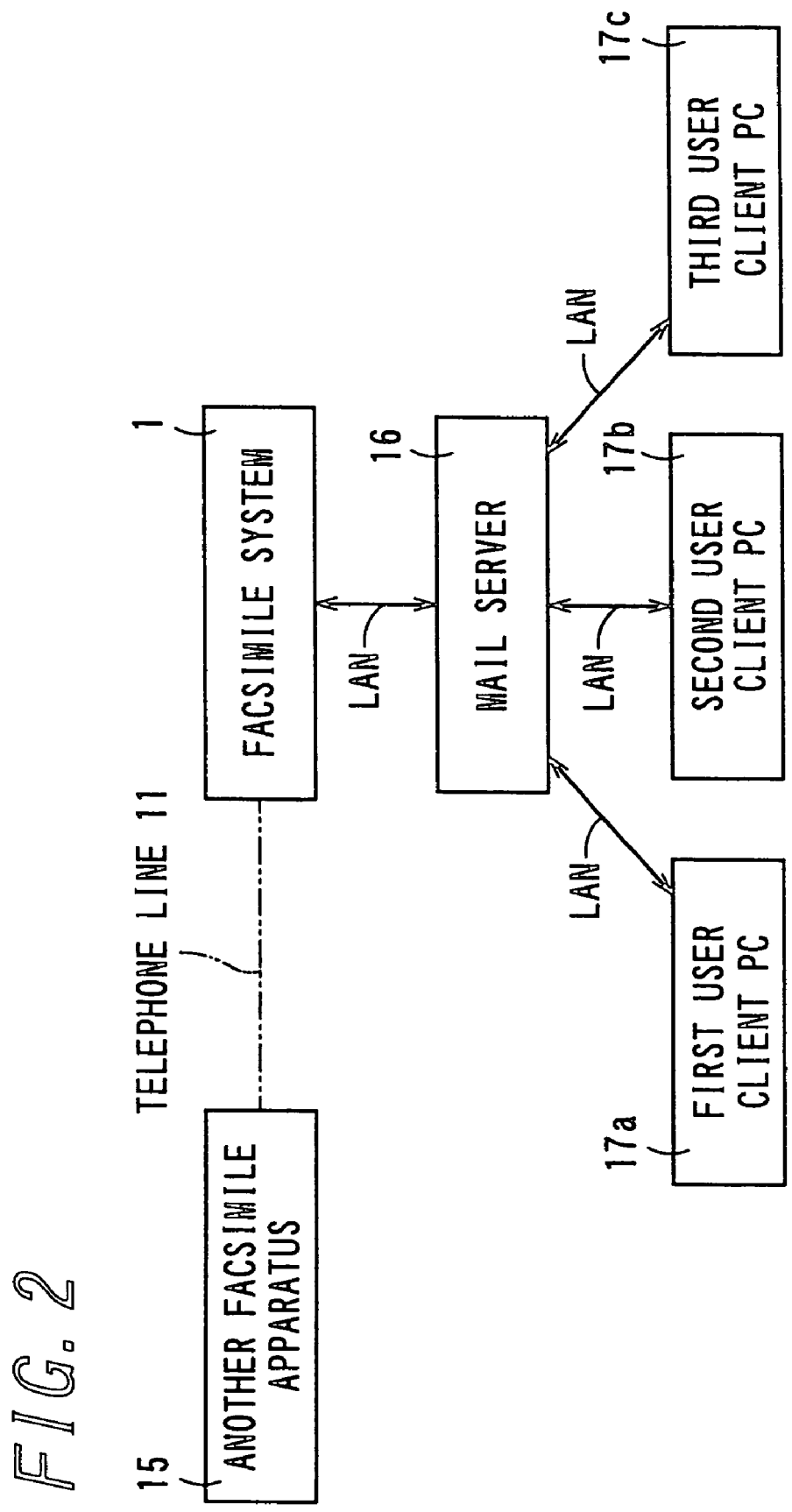
FIG. 2 is a view schematically showing the use form of the facsimile system.

FIG. 2 is a view schematically showing the use form of the facsimile system 1. The facsimile system 1 is electrically connected to another facsimile apparatus 15 via the telephone line 11 when sending and receiving the facsimile communication information. Moreover, the facsimile system 1 is continuously connected to the mail server apparatus 16 via the LAN controlling portion 7 and the LAN cable 13. Although the facsimile system 1 and the mail server apparatus 16 are connected by the LAN in the present embodiment, another embodiment of the invention is not restricted to the above, and the facsimile system 1 and the mail server apparatus 16 may be connected via, for example, the telephone line 11.

To the mail server apparatus 16, a plurality of personal computers (abbreviated as PCs) are connected by the LANs. The mail server apparatus 16 has storing means such as a hard disk, and has mailboxes associated with a plurality of predetermined e-mail addresses. E-mails sent to the respective e-mail addresses are stored in the mailboxes associated with the respective e-mail addresses.

To the mail server apparatus 16, a plurality of computers are connected. In FIG. 2, first to third user client PCs 17a to 17c are connected to the mail server apparatus 16. The first to third user client PCs 17a to 17c are connected to the mail server apparatus 16 by the LANs. The first to third user client PCs 17a to 17c have a mail sending and receiving function of being capable of receiving and reading e-mails sent to the respective e-mail addresses stored in the mailboxes of the mail server apparatus 16 and giving reply mails to the received e-mails to the facsimile system 1 via the mail server apparatus 16.

Further, each of the first to third user client PCs 17a to 17c has a display device, and is capable of causing the display device to display the e-mail received from the mail server apparatus 16 and reading it.

Figure 3:
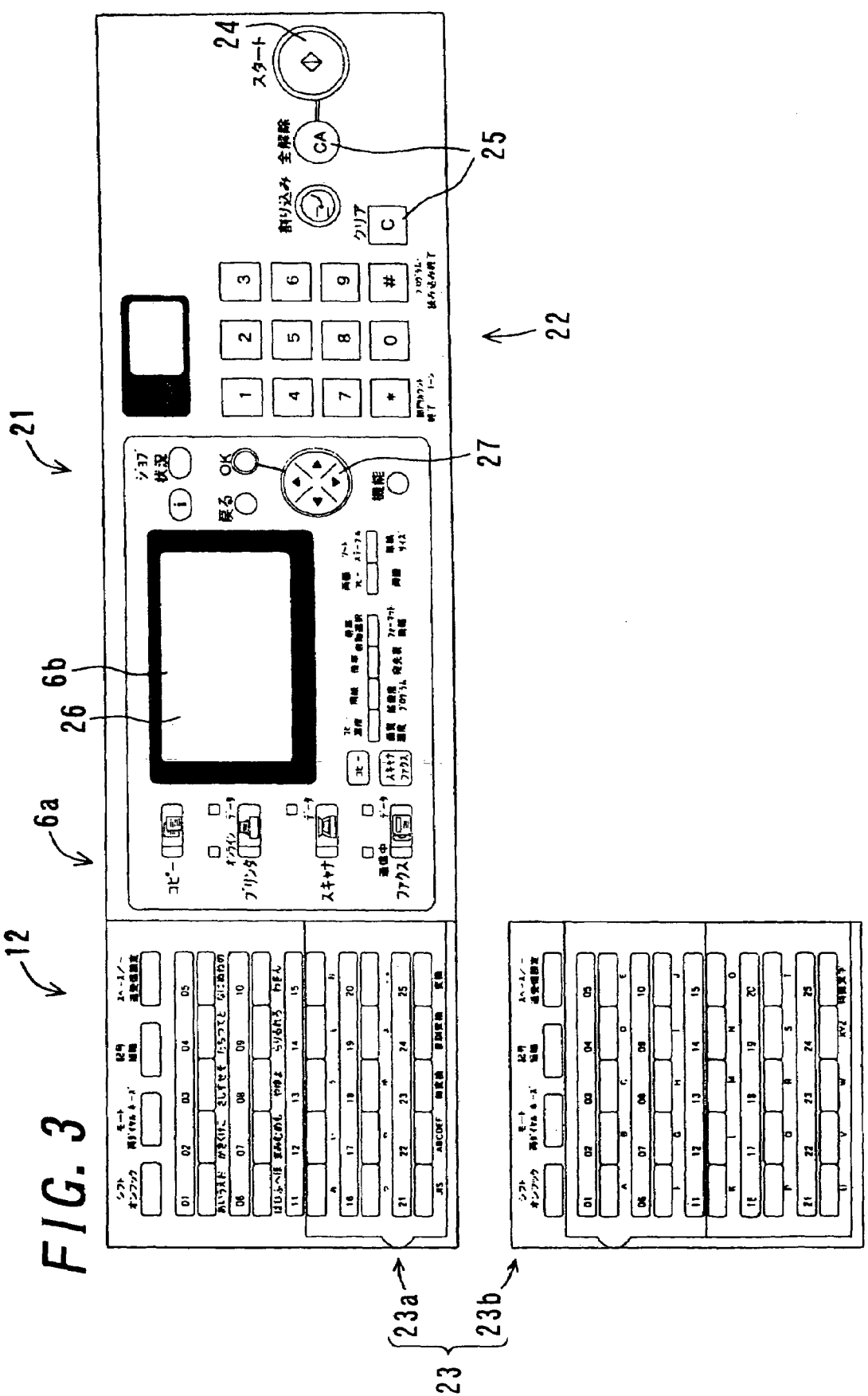
FIG. 3 is a view showing the appearance of an operating and displaying panel of the operating and displaying portion.

FIG. 3 is a view showing the appearance of an operating and displaying panel 21 of the operating and displaying portion 6. The operating and displaying portion 6 has the operating and displaying panel 21. On the operating and displaying panel 21, the operating keys 12 of the operating portion 6a are disposed, and a display screen 26 of the displaying portion 6b is placed. The operating portion 6a has, as the operating keys 12, numeric keys 22 for inputting numerical information, character input keys 23 for inputting character information, a start key 24 for giving a direction of executing an operation, clear keys 25 for deleting inputted information, a cross-shaped key 27 for moving a cursor displayed on the display screen 26 of the displaying portion 6b and so on. The character input keys 23 include kana input keys 23a for inputting hiragana and alphabet input keys 23b for inputting alphabetical letters. The operator operates the operating keys 12 disposed on the operating and displaying panel 21, and inputs information.

Table 1 shows the aforementioned condition table stored in the storing portion 8.

TABLE 1

| Registered party | No. | Notify party | Notification term | Set number of times | Remaining number of notifications |
|---|---|---|---|---|---|
| **--** (Co., Ltd.) | 1 | ab@*.co.jp | 04'7/7 AM10:00 | — | — |
| | 2 | cd**@***.co.jp | 04'7/7 AM10:00 | — | — |
| | 3 | ef**@***.co.jp | — | 15 | 10 |
| | 4 | gh**@***.co.jp | Every Fourth Monday | — | — |

In the storing portion 8, registered party information and notify party information are stored associated with each other. Moreover, notification term information or set number-of-times information are stored associated with the registered party information and the notify party information.

The registered party information, the notify party information, effective term information and the set number-of-times information can be stored in the storing portion 8 when the operator operates the operating portion 6a. A process of registering the information into the storing portion 8 will be described later.

The registered party information is predetermined sender information, and represents a sender sending the facsimile communication information. The notify party information indicates a notify party that is notified of the notification information indicative of reception of the facsimile communication information when the facsimile communication information from a predetermined sender is received. When the communication controlling portion 2 receives the facsimile communication information from the predetermined sender, the main controlling portion 9 generates the notification information indicative of reception of the facsimile communication information. The main controlling portion 9 is capable of notifying the notify party stored associated with the predetermined sender in the storing portion 8, that is, a registered party of the generated notification information. Moreover, in the storing portion 8, registered party name information that represents the name of the registered party is stored associated with the registered party information. For example, a registered party name such as " Co., Ltd." is stored associated with the facsimile number "--****" of the registered party. Since not only the facsimile number of the registered party but also the registered party name is stored associated and, for example, at the time of confirmation of registration contents on the displaying portion 6b, the main controlling portion 9 causes to display not only the facsimile number of the registered party but also the registered party name, a user can thereby grasp the registered party with ease.

The party to be notified information is address information of an e-mail in this embodiment. The main controlling portion 9 is capable of controlling the LAN controlling portion 7 to send the generated notification information to the e-mail address as the notified party by e-mail. Plural pieces of notify party information are stored associated with the registered party information.

The notification term information is term information, and represents a predetermined term. When the communication controlling portion 2 receives the facsimile communication information from the registered party recorded in the condition table during the predetermined term indicated by the notification term information, the main controlling portion 9 generates the notification information, and controls the LAN controlling portion 7 to send the generated notification information to the e-mail address as the notify party by e-mail. The notification term information contains, for example, date-and-time specifying information and day-of-the-week specifying information. The date-and-time specifying information represents the year, month, date and time of the end of the predetermined term. For example, in the case of 10 am, Jul. 7, 2004, the date-and-time specifying information is expressed as "04'7/7AM10:00" Therefore, in a case where the date-and-time specifying information is set as the notification term information, a term from the date and time when the date-and-time specifying information is set till the date and time indicated by the date-and-time specifying information is set as the predetermined term. The day-of-the-week specifying information represents a predetermined day of the week. For example, in the case of Monday in the fourth week in every month, the day-of-the-week information is expressed as "every fourth Monday". The notification term information is stored associated with the registered party information and the notify party information.

The set number-of-times information is number-of-receptions information, and represents a predetermined number of receptions. The main controlling portion 9 functions as counting means, and every time the facsimile communication information from the registered party indicated by the registered party information stored in the storing portion 8 is received, it counts the number of receptions of the facsimile communication information received from the registered party. When the receiving means receives the facsimile communication information from the registered party, the main controlling portion 9 generates the notification information and controls the LAN controlling portion 7 to send the generated notification information to the e-mail address of the notify party by e-mail in a case where the number of receptions of the facsimile communication information received from the registered party is equal to or less than a set number of times indicated by the set number-of-times information associated with the registered party. The set number-of-times information is stored associated with the registered party information and the notify party information.

Remaining number-of-notifications information is relevant-to-number-of-receptions information that is relevant to the number of receptions, and represents the number of times obtained by subtracting the number of times of sending the notification information to the notified party from the number of times indicated by the set number-of-times information. In other words, remaining number-of-times-of-sending information represents the number of times obtained by subtracting the number of receptions of the facsimile communication information from the registered party counted by the main controlling portion 9 from the number of times indicated by the set number-of-times information. The remaining number-of-times-of-sending information is stored associated with the remaining number-of-notifications information.

FIG. 4 is a view showing a state where the displaying portion 6b displays the registration contents registered in the storing portion 8 on the basis of the condition table of the storing portion 8. On the display screen 26 of the displaying portion 6b, the registered party information and the notify party information associated with the registered party information are displayed. The notification term information or the remaining number-of-notifications information is displayed associated with the respective notify party information.

Here, four pieces of the notify party information No. 1 to No. 4 are displayed associated with the registered party information "**--**." The notify party information and both the effective term information and the remaining number-of-notifications information are displayed side by side on the same line on the display screen. For example, the notify party "ab@***.co.jp" and an effective term "04' 7/7 AM10:00" of No. 1 are displayed side by side on the same line, so that it is easy for the user to know association between the notify party and the effective term or the remaining number of notifications.

Figure 5:
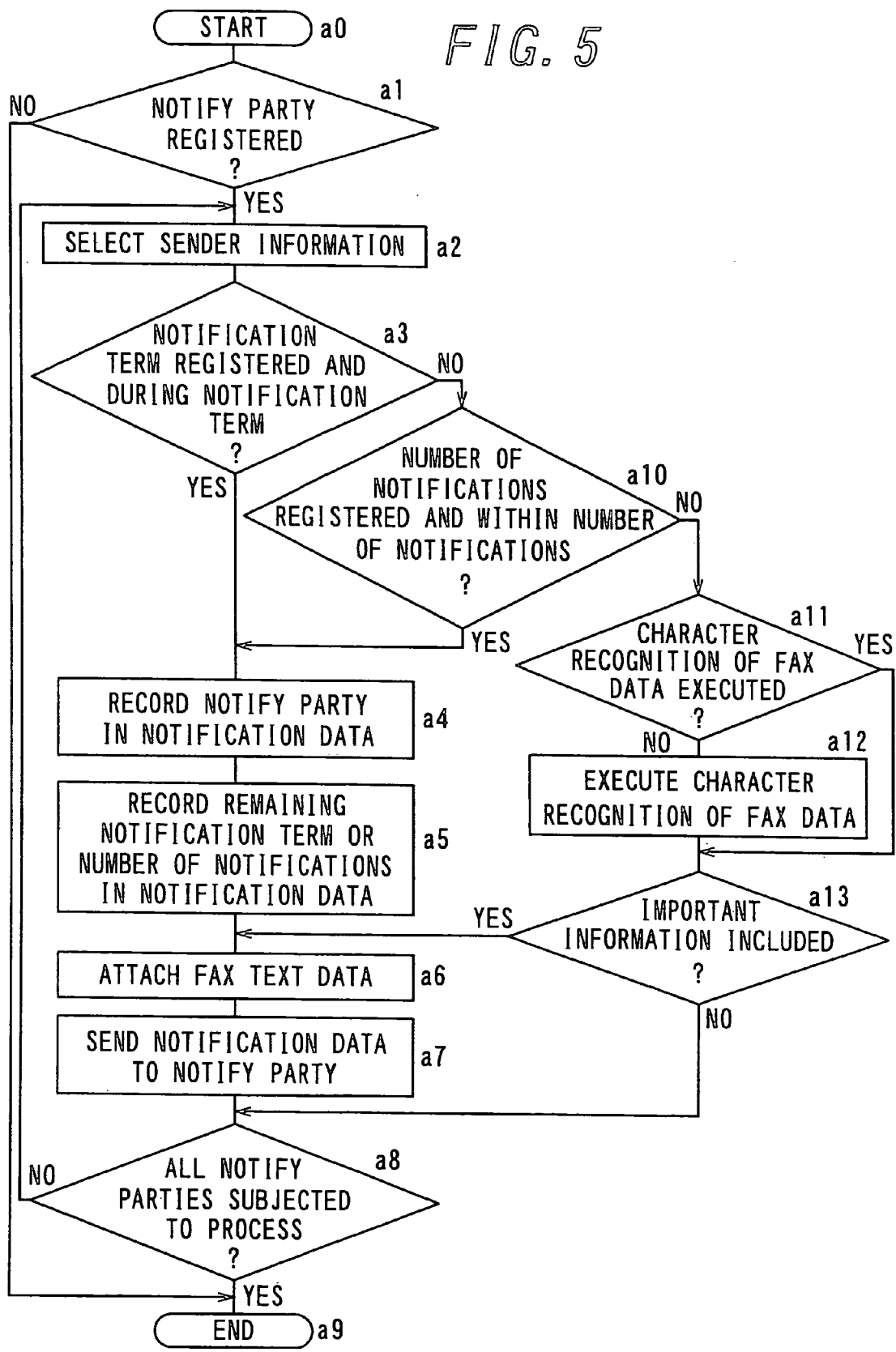
FIG. 5 is a flowchart of an operation process of the main controlling portion when the communication controlling portion receives the facsimile communication information via the telephone line.

FIG. 5 is a flowchart of an operation process of the main controlling portion 9 when the communication controlling portion 2 receives the facsimile communication information via the telephone line 11. When the communication controlling portion 2 receives the facsimile communication information and the sender information that represents the sender sending the facsimile communication information via the telephone line 11, the main controlling portion 9 gives the control command for printing the facsimile communication information onto a recording sheet to the encoding and decoding portion 3 and the printing portion 5, and the process goes from step a0 to step a1. At step a1, it is determined whether or not the sender information received by the communication controlling portion 2 is registered in the storing portion 8 as the registered party information and the sender information is registered associated with the registered party information.

When it is determined at step a1 that the sender information is registered, that is, stored associated with the registered party information, the process goes to step a2, whereas when it is determined that the sender information is not registered, the process goes to step a9, where the operation process is ended.

Next, at step a2, one of the sender information registered associated with the registered party information is selected. In concrete, at step a2, of the sender information, one that is not subjected to a determination process whether to notify of the notification information is selected, and the process goes to step a3. The determination process whether to notify of the notification information includes at least one of step a3, step a11 and step a13 described later.

Next, at step a3, it is determined whether or not the notification term information is registered associated with the sender information selected at step a2 in the storing portion 8 and the time when the facsimile communication information is received is during a notification term indicated by the notification term information. The main controlling portion 9 has clocking means such as a real time clock, and keeps time. The main controlling portion 9 has storing means for temporarily storing information, and stores the time when the facsimile communication information is received into a memory. At step a3, it is determined whether or not the time when the facsimile information is received stored into the memory of the main controlling portion 9 is during the term indicated by the notification term information. The time when the facsimile communication information is received is defined as, for example, the time when the communication controlling portion 2 starts to receive the facsimile communication information according to a communication protocol of facsimile communication. By selecting the time like this, it is prevented that, for example, it depends on time periods of transmitting the facsimile communication information whether it becomes during the notification term or after the notification term.

When it is determined at step a3 that the notification term information is registered associated with the sender information selected at step a2 in the storing portion 8 and it is during the notification term, the process goes to step a4. At step a4, the notify party is recorded in notification data indicative of the notification information, that is, the notification information is generated so as to include the notify party information. The main controlling portion 9 functions as notification information generating means that generates the notification information. In concrete, at step a4, the notify party information is recorded in the e-mail. The notify party information included in the notification information includes all the notify party information stored associated with the registered party information in the storing portion 8. When the process at step a4 finishes, the process goes to step a5. E-mail address information is stored in the storing portion 8 as the notify party information, and notify party name information is stored associated with the notify party information. The notification name information represents the name of a notified person associated with the e-mail address information in the notify party. At step a3, the notification information is generated so as to include the notify party name information as the notify party information. The e-mail address information represents the e-mail address.

At step a5, a remaining notification term or a remaining number of notifications is recorded in the notification data that represents the notification information. The remaining notification term represents, of the notification term stored in the storing portion 8, a term from the time when the facsimile communication information is received till the end of the notification term. The remaining number of notifications is as described before. At step a5, in concrete, information that represents the remaining notification term or information of the remaining number of notifications is recorded in the e-mail. When the process at step a5 finishes, the process goes to step a6.

At step a6, the notification information is generated so as to include facsimile (FAX) text information, that is, image information received by the communication controlling portion 2. In other words, at step a6, facsimile text data is attached to the e-mail. The facsimile text information received by the communication controlling portion 2 is decoded by the encoding and decoding portion 3, and thereafter, compressed by a predetermined compression method, filed and stored in the storing portion 8. The main controlling portion 9 attaches the filed image information stored in the storing portion 8 to the e-mail. The predetermined compression method is, for example, JPEG. When the process at step a6 finishes, the process goes to step a7.

At step a7, the LAN controlling portion 7 is controlled to send the notification data indicative of the notification information to the notify party indicated by the notification information, that is, send the written e-mail to the e-mail address of the communication destination, and the process goes to step a8.

At step a8, it is determined whether or not all pieces of the notify party information stored associated with the registered party information in the storing portion 8 have been subjected to the determination process whether to notify of the notification information. In a case where it is determined at step a8 that all pieces of the notify party information stored associated with the registered party information have been subjected to the determination process whether to notify of the notification information, the process goes to step a9, where the operation process is ended. When it is determined at step a8 that all pieces of the notify party information stored associated with the registered party information have not been subjected to the determination process whether to notify of the notification information, the process goes to step a2.

When it is determined at step a3 described before that the notification term information is not registered associated with the sender information selected at step a2 in the storing portion 8 or that it is not during the notification term, the process goes to step a10. At step a10, it is determined whether or not the number-of-notifications information is registered associated with the sender information selected at step a2 in the storing portion 8 and the number of receptions of the received facsimile communication information is within the number of notifications indicated by the number-of-notifications information. When it is determined at step a10 that the number-of-notifications information is registered associated with the sender information selected at step a2 in the storing portion 8 and the number of receptions of the received facsimile communication information is within the number of notifications indicated by the number-of-notifications information, the process goes to step a10.

When it is determined at step a10 that the number-of-notifications information is not registered associated with the sender information selected at step a2 in the storing portion 8 or that the number of receptions of the received facsimile communication information is not within the number of notifications indicated by the number-of-notifications information, the process goes to step a11.

At step a11, it is determined whether or not character recognition of characters included in the image information of the facsimile communication information has been executed. When it is determined at step a11 that the character recognition has not been executed, the process goes to step a12, whereas when it is determined that the character recognition has been executed, the process goes to step a12.

At step a12, the character recognition of the image information of the facsimile communication information is executed. In concrete, it is detected by pattern matching whether or not there is a character pattern of "important" or "urgent" in the image information of the facsimile communication information. When the process at step a12 finishes, the process goes to step a13. At step a13, it is determined whether important information is included or not. That is to say, on the basis of the result of detection at step a12, it is determined whether the character pattern of "important" or "urgent" is included or not. When it is determined at step a13 that the important information is included, that is, the character pattern of "important" or "urgent" is included, the process goes to step a6. When it is determined at step a13 that the important information is not included, the process goes to step a8.

The flowchart shown in FIG. 5 is executed every time the communication controlling portion 2 receives the facsimile communication information.

FIG. 6 is a view showing a state where the display device displays the notification information indicated by the notification data sent to the notify party at step a7. It is possible to read the notification information, that is, text information of the e-mail, for example, by causing any of the first to third user client PCs 17a to 17c connected to the mail server apparatus 16 to display.

In the notification information, a sentence of "a FAX from registered oo CO., Ltd. has been received" that represents reception of the facsimile communication information is recorded. Moreover, in the text of the e-mail, as notification contents, the time and date of reception of the facsimile communication information, the size of a sheet of paper of the received facsimile communication information, the number of the sheets of paper of the received facsimile communication information and the degree of importance are recorded. As the degree of importance, "important" is recorded in a case where it is determined at step a13 that the important information is included, and "ordinary" is recorded in other cases.

Further, in the notification information, as effective registration contents, the remaining notification term or the remaining number of notifications is recorded. The remaining notification term is expressed by, for example, a time period. In a case where the remaining notification term is recorded, the user can know a term of notification of the notification information at the notify party, and, for example, in a case where it is scheduled that the facsimile communication information is sent to him/her, he/she can use as a material for determining whether to change the notification term information, or a material for determining whether to make a contact with a sender scheduled to send the facsimile communication information to him/her, so that it is possible to further increase convenience.

In a case where the facsimile communication information from the sender indicated by the registered party information is received, the notify party indicated by the notify party information stored associated with the registered party information in the storing portion 8 is notified of the notification information at every receptions as far as it is within a set number of times, so that in a case where plural pieces of notify party information are stored associated with the predetermined sender information, there is a case where some notified parties are notified of the notification information that is not directly related to themselves. Therefore, in a case where the remaining number of notifications is recorded, the notified person of the notify party can use as, for example, a material for determining whether to change the set number-of-times information in a case where it is scheduled that the facsimile communication information is sent to him/her.

Further, in the notification information, the notify party information associated with the registered party information is recorded. In a case where plural pieces of notify party information are registered associated with the registered party information, all pieces of the notify party information associated with the registered party information are recorded. Consequently, the user can know the notify party that is notified of the obtained notification information at the notify party. For example, in a case where the received facsimile communication information is printed and a plurality of notified parties are notified of the notification information, there is a strong possibility that any notified person of the plurality of notified parties keeps the printed facsimile communication information. In this case, it is possible to narrow the notified person keeping the printed facsimile communication information, and it is possible to reduce time to look for the printed facsimile communication information.

In the storing portion 8, the name information is registered associated with the notify party information as described before. The name information represents the owner of the e-mail address of the notify party. Since the name information is recorded in the notify party information included in the notification information, the notify party receiving the e-mail can easily grasp who is notified of the notification information except himself/herself.

Further, in the notification information, as the facsimile text information, facsimile number information and IP address information are recorded.

As described above, in the facsimile system 1, in a case where the facsimile information from the sender indicated by the registered party information is received, the notification information is sent to the notify party indicated by the notify party information registered associated with the registered party information only when it is determined that a predetermined notification condition is satisfied. It is determined by the main controlling portion 9 whether the predetermined notification condition is satisfied or not, on the basis of the registration contents of the notification term or the set number of times recorded in the aforementioned condition table, or on the basis of whether the important information is included in the facsimile communication information. In the facsimile system 1, by setting the notification term and the set number of times described before to a condition desired by the user, that is, a notification term and a set number of times desired by the user, it is possible to notify of the notification information only when the condition desired by the user is satisfied, so that it is possible to increase convenience. Since the facsimile system 1 does not execute an operation process of notifying of the notification information when the predetermined condition is not satisfied, it is possible to prevent a wasteful operation process and, for example, it is possible to prevent that another operation process in the facsimile system 1 such as an operation for facsimile communication is interrupted. Moreover, even when the processing efficiency of the main controlling portion 9 is low, it is possible to smoothly control the respective portions of the facsimile system 1.

Even when the user is in a remote place away from the facsimile system 1, the notification information is sent by e-mail, so that the user can grasp reception of the facsimile communication information by obtaining the notification information.

Further, by setting the aforementioned notification term, it is possible to notify of the notification information only during a term desired by the user. In a case where reception of the facsimile communication information is predetermined, notification after a predetermined term is prevented, so that it is possible to prevent wastefully notifying the notify party of the notification information, and it is possible to reduce the processes of the facsimile system 1.

Further, in a case where the number of receptions of receiving the facsimile communication information is predetermined, by registering the aforementioned set number of times, notification of the notification information is prevented when the facsimile communication information has been received more than the set number of receptions, so that it is possible to prevent wastefully notifying the notify party of the notification information, and it is possible to reduce the processes of the facsimile system 1.

Figure 7:
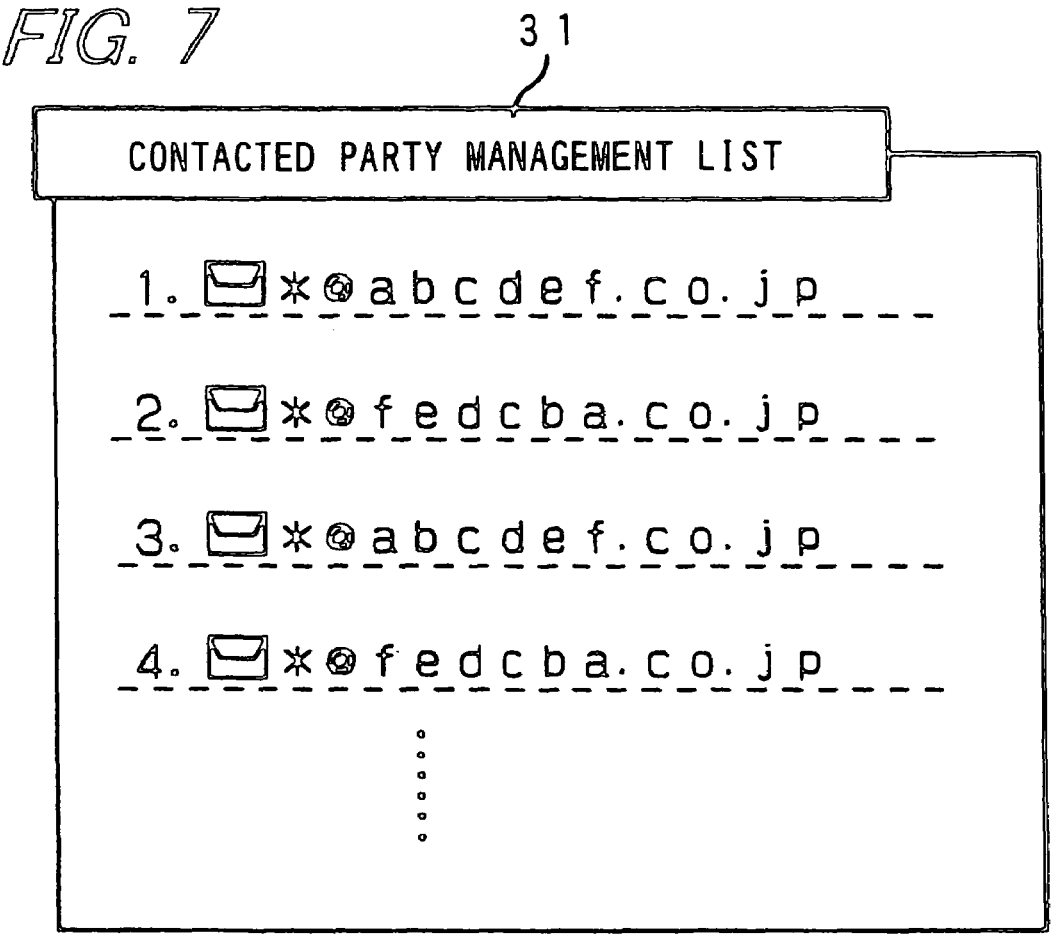
FIG. 7 is a view showing a state where a notify party management list is displayed by the displaying portion.

FIG. 7 is a view showing a state where a notify party management list 31 is displayed by the displaying portion 6b. The notify party management list 31 shows the notify party information that can be stored, that is, can be registered as the notify party into the storing portion 8. The notify party management list 31 is stored in the storing portion 8. The storing portion 8 works as management information storing means.

It is possible to input the aforementioned notify party information to the facsimile system 1 by operation of the operating portion 6a by the user. However, in a case where the notify party information inputted by the operating portion 6a is not recorded in the notify party management list 31, the main controlling portion 9 does not register the inputted notify party information into the storing portion 8.

Figure 8:
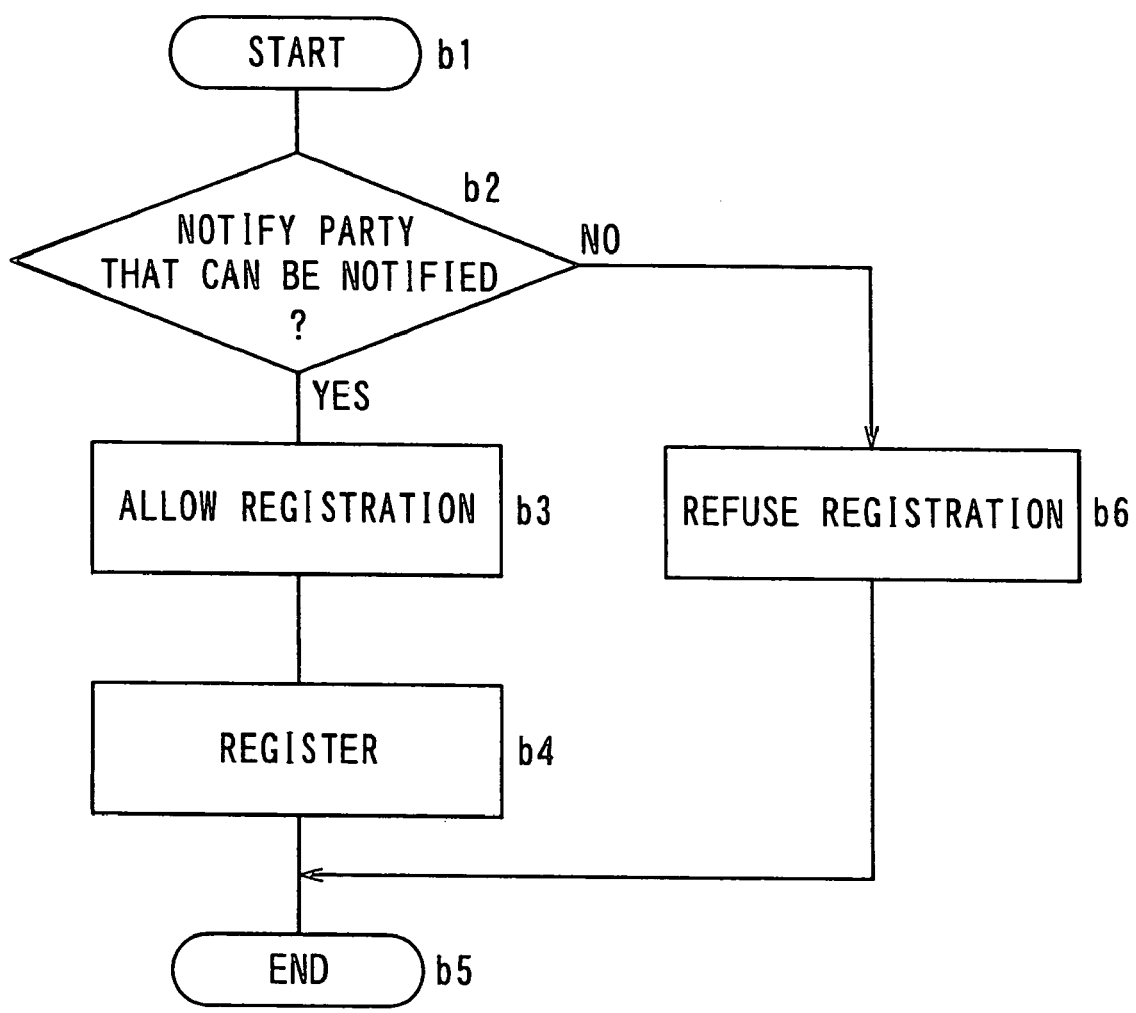
FIG. 8 is a flowchart showing an operation process of the main controlling portion when the notify party information is registered associated with the registered party information stored in the storing portion.

FIG. 8 is a flowchart showing an operation process of the main controlling portion 9 when the notify party information is registered associated with the registered party information stored in the storing portion 8. With the operating portion 6a, the operator can switch to a registration mode for registering the notification information by operating a predetermined operating key 12 of the operating keys 12. In the registration mode, when the notify party information is inputted by operation of character input keys and a start key 24 is operated, the process goes from step b1 to step b2. The notify party information inputted by the operator is temporarily stored in, for example, a buffer of the main controlling portion 9.

At step b2, it is determined whether or not the notify party indicated by the inputted notify party information is a notify party that can be notified. In concrete, it is determined whether or not the inputted notify party information exists in the aforementioned notify party management list 31. When it is determined at step b2 that it is the notify party that can be notified, that is, the inputted notification information is recorded in the notify party management list 31, the process goes to step b3.

At step b3, registration is allowed, and the process goes to step b4. At step b3, for example, the displaying portion 6b is caused to display information indicative that registration is allowed.

At step b4, the storing portion 8 is controlled, the inputted notify party information is stored, that is, registered in the storing portion 8, and the process goes to step b5, where the operation process is ended.

When it is determined at step b2 that it is not the notify party that can be notified, that is, the inputted notification information does not exist in the notify party management list 31, the process goes to step b6. At step b6, registration is refused, and the process goes to step b5. At step b6, for example, the displaying portion 6b is caused to display information indicative that registration is not allowed. When the process at step b6 finishes, the process goes to step b5.

As described above, in a case where registration is not allowed, the information is not stored into the storing portion 8 even if an operation of registration is executed with the operating portion 6a, with the result that in companies and so on, it is avoided that the notify party information is registered by an outsider, and in particular, it is possible to prevent leakage of a top secret in a case where the notification information includes the received facsimile communication information. Moreover, by configuring as described above, it is possible to change the setting state of the term information and so on without inputting security information such as a password with regard to the notify party that is allowed to be registered, that is, the notify party registered in the notify party management list 31, so that it is possible to increase convenience.

By inputting a predetermined password with the operating portion 6a, it is possible to switch to a management list setting mode for adding and deleting registered information, and in this management list setting mode, it is possible to add and delete the registration contents with the operating portion 6a.

FIG. 9 is a flowchart showing an operation process of the main controlling portion 9 when an e-mail is received. When the LAN controlling portion 7 receives an e-mail from the mail server apparatus 16 via the LAN cable 13, the process goes from step c0 to step c1. At step c1, it is determined whether or not the received e-mail is a reply mail to the e-mail that the facsimile system 1 has sent to the notify party of the notify party information stored in the storing portion 8 as the notification information. Whether it is the reply mail or not is determined by detecting predetermined identification information added to the e-mail. Since the predetermined identification information is added as it is in the case of reply to the sent e-mail, it is possible to determine that it is the reply mail at the time of reception.

At step c2, the registration contents stored associated with the notify party sending the reply mail are changed. The storing portion 8 works as change setting information storing means that stores change setting information for changing a predetermined condition. The change setting information is, for example, information for extending the notification term by a predetermined term or information for increasing the set number of times by a predetermined number of times. The main controlling portion 9 changes the predetermined condition, that is, the notification term or the number of notifications on the basis of the change setting information. In the case of the reply mail from the notify party that the notification term is set, the main controlling portion 9 extends the notification term by the predetermined term and causes the storing portion 8 to store, and in the case of the reply mail from the notify party that the number of notifications is set, the main controlling portion 9 increases the set number of times by the predetermined number of times and causes the storing portion 8 to store. The user can previously register the predetermined term or the predetermined number of times stored in the storing portion 8 as the change setting information by operating the operating portion 6a.

When the process at step c2 finishes, the process goes to step c3, where the operation process is ended. When, at step c1, it is determined that the received e-mail is not the reply mail, the process goes to step c3, where the operation process is ended.

As described above, in the facsimile system 1, when the reply mail to the sent e-mail is sent from the notified party and received by the LAN controlling portion 7, on the basis of the change setting information stored in the storing portion 8, the main controlling portion 9 changes the predetermined condition, in concrete, extends the notification term or increases the set number of times. The notified party can change the predetermined condition by a simple operation of sending the reply mail to the notification e-mail from the facsimile system 1, so that it is possible to further increase convenience.

In the facsimile system 1 of the present embodiment, the effective term information or the set number-of-times information is stored associated with the registered party information and the notify party information into the storing portion 8, but in a facsimile system of another embodiment of the invention, both the notification term information and the set number-of-times information may be stored associated with the registered party information and the notify party information. In this case, it is possible to configure so as to notify of the notification information when the main controlling portion 9 determines that the time when the facsimile communication information is received is during the notification term or that the number of receptions of the facsimile communication information is within the set number of times, and it is possible to configure so as to notify of the notification information when the main controlling portion 9 determines that the time when the facsimile communication information is received is during the notification term and the number of receptions of the facsimile communication information is within the set number of times. By thus setting two conditions of the notification term and the set number of times, it is possible to increase flexibility of setting for notification.

In another embodiment of the invention, in the operation process of the main controlling portion 9, the process at step a5 in FIG. 5 may be omitted. In this case, the facsimile text data is not attached to the e-mail, so that it is possible to suppress the amount of data of the sent e-mail, and it is possible to shorten a time period of sending. Moreover, in the case of notifying a plurality of notified parties of the notification information, it is possible to send the notification information more promptly, so that the notified parties can obtain the notification information promptly.

Further, in still another embodiment of the invention, the sender information may be telephone number information. The facsimile system 1 has a telephone function. In this case, as the notification information, the system notifies the notify party that the facsimile communication information from the registered party has been received by transmitting voice information that represents reception of the facsimile information, when switched to a talk state after dialing and calling a telephone number indicative of the telephone number information. By registering the notify party in the form of the telephone number in this way, it is also possible to notify that the facsimile communication information has been received by telephone, so that convenience further increases.

In still another embodiment of the invention, the processes at step a11 to step a13 of FIG. 5 may be processes of detecting an F code included in the facsimile communication information and determining whether or not the important information is included on the basis of the F code. The F code is added to the facsimile communication information at the sender of the facsimile communication information. When detecting the F code, the main controlling portion 9 determines that the important information is included in the facsimile communication information.

FIG. 10 is a flowchart showing an operation process of the main controlling portion 9 in a facsimile system of still another embodiment of the invention. The facsimile system of the present embodiment is the same as the facsimile system of the aforementioned embodiment, and only the operation process of the main controlling portion 9 is different. The main controlling portion 9 of the facsimile system of the present embodiment sends the notification information only when the time when the facsimile communication information is received is during a predetermined term indicated by the notification term information.

Since step d0 to step d9 correspond to step a1 to step a9 of the flowchart shown in FIG. 5, respectively, a description of the corresponding portions will be omitted, and only different portions will be described. In the present embodiment, at step d3, when it is determined that the notification term information is not registered associated with the sender information selected at step d2 in the storing portion 8 or that it is not during the notification term, the process goes to step d8.

As described above, in the facsimile system of the present embodiment, the notification information is sent only when the time when the facsimile communication information is received is during the predetermined term indicated by the notification term information, so that it is possible to notify of the notification information only during a term desired by the user. In a case where reception of the facsimile communication information is predetermined, notification after a predetermined term is prevented, so that it is possible to prevent wastefully notifying the notify party of the notification information, and it is possible to reduce the processes of the facsimile system. Moreover, as compared with the facsimile system 1 of the aforementioned embodiment, it is possible to reduce a processing load of the main controlling portion 9, and it is possible to shorten a time period for notification of the notification information.

FIG. 11 is a flowchart showing an operation process of the main controlling portion 9 in a facsimile system of still another embodiment of the invention. The facsimile system of the present embodiment is the same as the facsimile system of the aforementioned embodiment, and only the operation process of the main controlling portion 9 is different. The main controlling portion 9 of the facsimile system of the present embodiment notifies of the notification information only when the number-of-notifications information is stored in the storing portion 8 and the number of receptions of the received facsimile communication information is within the number of notifications indicated by the number-of-notifications information.

Since step e0 to step e3 correspond to step a1 to step a3 shown in the flowchart of FIG. 5, respectively, a process at step e3 corresponds to the process at step a10, and processes at step e4 to e9 correspond to the processes at step a4 to step a9, respectively, a description of the corresponding portions will be omitted, and only different portions will be described.

In the present embodiment, when the process at step e2 finishes, the process goes to step e3. When it is determined at step e3 that the number-of-notifications information is registered associated with the sender information selected at step e2 in the storing portion 8 and the number of receptions of the received facsimile communication information is within the number of notifications indicated by the number-of-notifications information, the process goes to step e4, whereas when it is determined that the number-of-notifications information is not registered associated with the sender information selected at step a2 in the storing portion 8, or that the number of receptions of the received facsimile communication information is not within the number of notifications indicated by the number-of-notifications information, the process goes to step e8.

As described above, the facsimile system of the present embodiment sends the notification information only when the number-of-notifications information is registered in the storing portion 8 and the number of receptions of the received facsimile communication information is within the number of notifications indicated by the number-of-notifications information, so that it is possible to notify of the notification information only by number of times desired by the user. In a case where reception of the facsimile communication information is predetermined, notification of the notification information is prevented when the facsimile communication information is received more than a predetermined number of receptions, so that it is possible to prevent wastefully notifying the notify party of the notification information, and it is possible to reduce the processes of the facsimile system. Moreover, as compared with the facsimile system 1 of the aforementioned embodiment, it is possible to reduce the processing load of the main controlling portion 9, and it is possible to shorten the time period for notification of the notification information.

Further, the facsimile systems of the respective embodiments may be Internet facsimiles each connected to the Internet and capable of sending and receiving the facsimile communication information via the Internet. These facsimile systems can also achieve the same effect.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile system comprising:

receiving means for receiving facsimile communication information given via a communication line and sender information indicative of a sender who sent the facsimile communication information;

notifying means for notifying of notification information indicative that the facsimile communication information was received;

storing means for storing predetermined sender information and notify party information indicative of a notify party in association with each other;

clocking means for keeping time; and controlling means for causing, when the receiving means receives the facsimile communication information and the sender information, the notifying means to notify the notify party, indicated by the notify party information associated with the received sender information, of the notify party information only when determining that the received sender information is stored in the storing means and, in a case where a predetermined notification term is set, time when the facsimile communication information starts to be received, the time being checked by the clocking means, is during the predetermined notification term.

2. The facsimile system of claim 1, further comprising inputting means for inputting the notify party information in association with the predetermined sender information; and management information storing means for storing the notify party information capable of being stored in the storing means, and wherein only when the notify party information inputted by the inputting means is stored in the management information storing means, the controlling means causes the storing means to store the inputted notify party information.

3. The facsimile system of claim 1, further comprising detecting means for detecting whether or not the facsimile communication information received by the receiving means includes important information indicative that the facsimile communication information is important, and wherein the controlling means causes the notifying means to notify the notify party, indicated by the notify party information associated with the received sender information, of the notification information when the facsimile communication information received by the receiving means includes the important information.

4. The facsimile system of claim 1, wherein the controlling means causes the notifying means to notify, as the notify party information, of the date and time when the facsimile communication information is received.

5. The facsimile system of claim 1, wherein the controlling means causes the notifying means to notify, as the notification information, of facsimile text information.

6. A facsimile system comprising:

receiving means for receiving facsimile communication information given via a communication line and sender information indicative of a sender who sent the facsimile communication information;

notifying means for notifying a notify party of notification information indicative that the facsimile communication information was received;

storing means for storing predetermined sender information and notify party information indicative of a notify party by respectively associating one predetermined sender information with a plurality of pieces of notify party information, and associating notify party information with a predetermined notification condition; and controlling means for causing, when the receiving means receives the facsimile communication information and the sender information, the notifying means to notify the notify party of the notify party information only when determining that the received sender information is stored in the storing means and, in a case where a predetermined notification condition is set, the notify party being indicated by the notify party information associated with the received sender information and the predetermined notification condition determined as being satisfied.

7. The facsimile system of claim 6, wherein the controlling means causes the notifying means to notify, as the notification information, of the notify party information stored in association with the predetermined sender information in the storing means 8. The facsimile system of claim 6, wherein the controlling means causes the notifying means to notify, as the notification information, of the facsimile communication information received by the receiving means.

9. The facsimile system of claim 6, further comprising change setting information storing means for storing change setting information used for changing the predetermined condition, wherein the receiving means receives an e-mail given via the communication line, the notifying means notifies of the notification information by e-mail, and the controlling means changes the predetermined condition on the basis of the change setting information stored in the change setting information storing means when a reply mail to the e-mail sent by the notifying means is sent, and received by the receiving means.

10. The facsimile system of claim 6, further comprising counting means for counting a number of receptions of the facsimile communication information given from the sender indicated by the predetermined sender information stored in the storing means and received by the receiving means, and wherein the storing means stores number-of-receptions information indicative of a predetermined number of receptions as the predetermined notification condition, and the controlling means determines that the predetermined notification condition is satisfied when the number of receptions counted by the counting means is equal to or less than the predetermined number of receptions indicated by the number-of-receptions information stored in the storing means.

11. The facsimile system of claim 10, wherein the notification information includes relevant-to-number-of-receptions information that is relevant to the number of receptions stored in the storing means, and the relevant-to-number-of-receptions information represents a remaining number of receptions obtained by subtracting the number of times that is the number of receptions of the facsimile communication information from the sender indicated by the predetermined sender information counted by the counting means, from the predetermined number of receptions stored in the storing means.

12. The facsimile system of claim 6, wherein the storing means stores term information indicative of a predetermined term as the predetermined notification condition, and the controlling means determines that the predetermined notification condition is satisfied when facsimile communication information from a sender indicated by the predetermined sender information has been received during the predermined term indicated by the term information.

13. The facsimile system of claim 12, wherein the notification information includes relevant-to-term information that is relevant to the term information stored in the storing means, and the relevant-to-term information represents, of the predetermined term indicated by the term information, a remaining term from reception of the facsimile communication information by the control means till an end of the predetermined term indicated by the term information.

14. The facsimile system of claim 12, wherein a predetermined term indicated by the notification term information is specified by a predetermined day of the week.

* * * * *